United States Patent
Ah et al.

(10) Patent No.: US 12,486,961 B2
(45) Date of Patent: Dec. 2, 2025

(54) VEHICLE LIGHTING DEVICE

(71) Applicant: HYUNDAI MOBIS CO., LTD., Seoul (KR)

(72) Inventors: Sang Min Ah, Yongin-si (KR); Suk Ho Hwang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/390,554

(22) Filed: Dec. 20, 2023

(65) Prior Publication Data

US 2024/0401762 A1 Dec. 5, 2024

(30) Foreign Application Priority Data

May 30, 2023 (KR) ........................ 10-2023-0069152

(51) Int. Cl.
*F21S 41/43* (2018.01)
*F21S 41/24* (2018.01)
*F21S 43/239* (2018.01)
*F21Y 115/10* (2016.01)

(52) U.S. Cl.
CPC ............. *F21S 41/435* (2018.01); *F21S 41/24* (2018.01); *F21S 43/239* (2018.01); *F21Y 2115/10* (2016.08)

(58) Field of Classification Search
CPC ........ F21S 41/24; F21S 43/239; F21S 41/435; F21S 43/237; F21S 43/27; F21Y 2115/10; G02B 6/0023; G02B 6/0025; G02B 6/0026; G02B 6/0028; G02B 6/0013
See application file for complete search history.

(56) References Cited

U.S. PATENT DOCUMENTS

| 2015/0085524 A1* | 3/2015 | Wang ................. G02B 6/0023 29/841 |
| 2018/0267225 A1* | 9/2018 | Wong ................. G02B 6/0036 |
| 2020/0158939 A1* | 5/2020 | Lotan ................. G02B 6/0031 |

FOREIGN PATENT DOCUMENTS

| FR | 3105457 A1 * | 6/2021 | ............. F21S 43/19 |
| JP | 2012047973 A * | 3/2012 | |
| KR | 0176180 B1 * | 5/1999 | |

OTHER PUBLICATIONS

Search English translation of KR 0176180 B1 (Year: 1999).*
English translation of FR-3105457-A1 (Year: 2021).*
Search English translation of JP-2012047973-A (Year: 2012).*

* cited by examiner

*Primary Examiner* — Omar Rojas Cadima
(74) *Attorney, Agent, or Firm* — MORGAN, LEWIS & BOCKIUS LLP

(57) ABSTRACT

An embodiment of the present invention provides a vehicle lighting device including a light source configured to generate light, a light guide including a light incident surface facing the light source configured to transmit light as the light enters the light guide through the light incident surface and a cap member assembled to the light guide to cover the light incident surface, wherein the cap member is disposed with a structure in which one surface of the cap member is in contact with the light incident surface and the other surface thereof is in contact with the light source to fill a space between the light incident surface and the light source.

8 Claims, 4 Drawing Sheets

[FIG. 1]
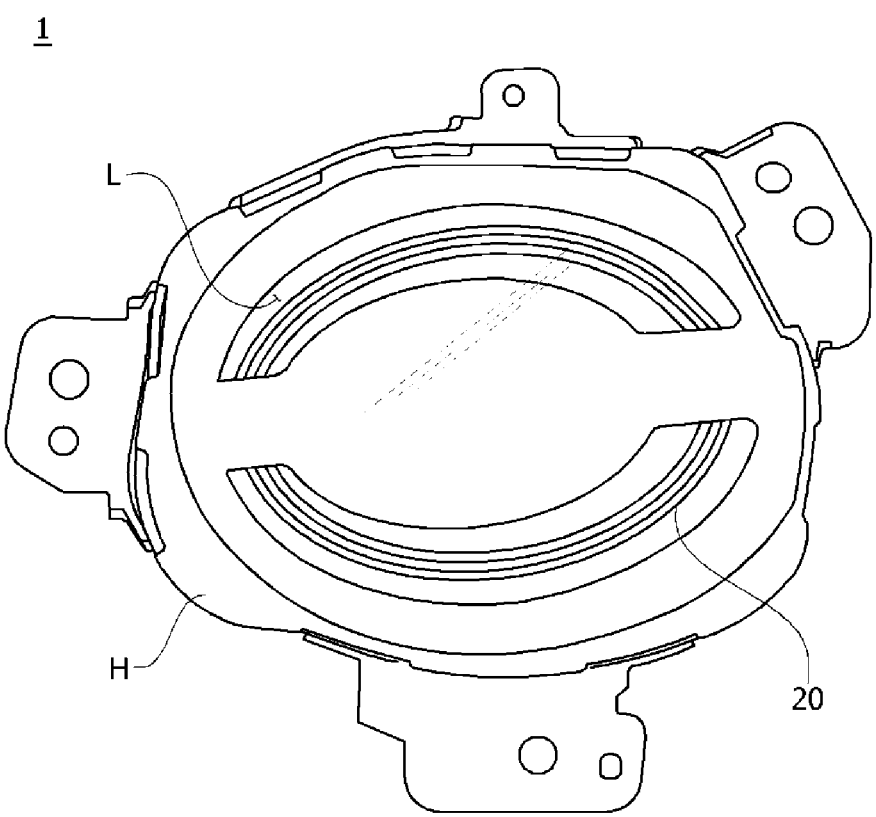

[FIG. 2]
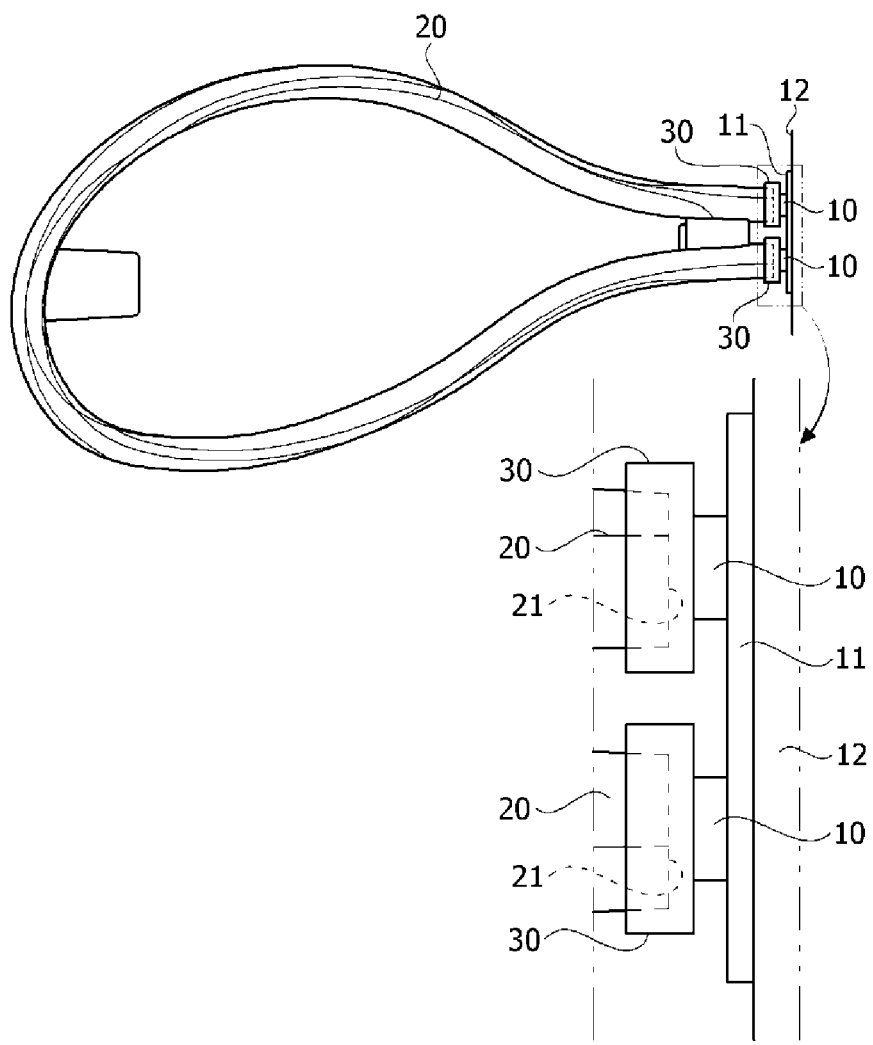

[FIG. 3]
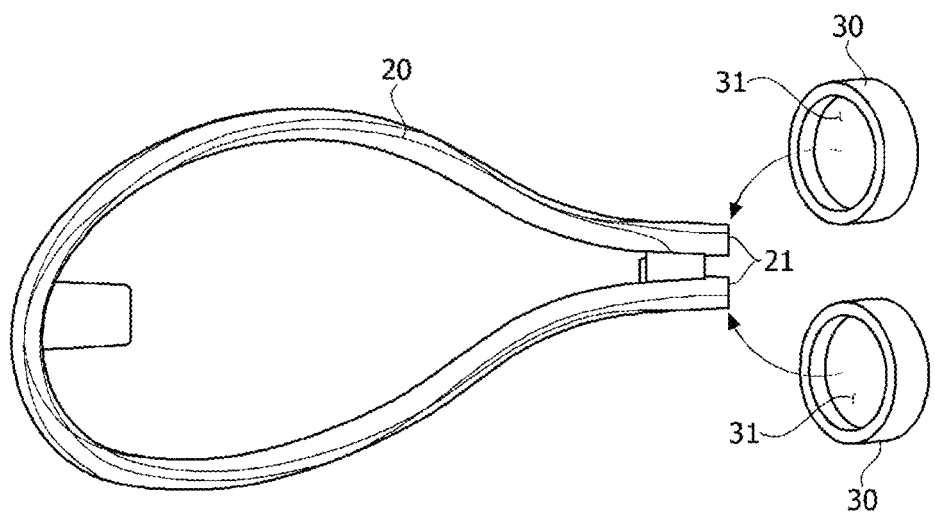
[FIG. 4A]
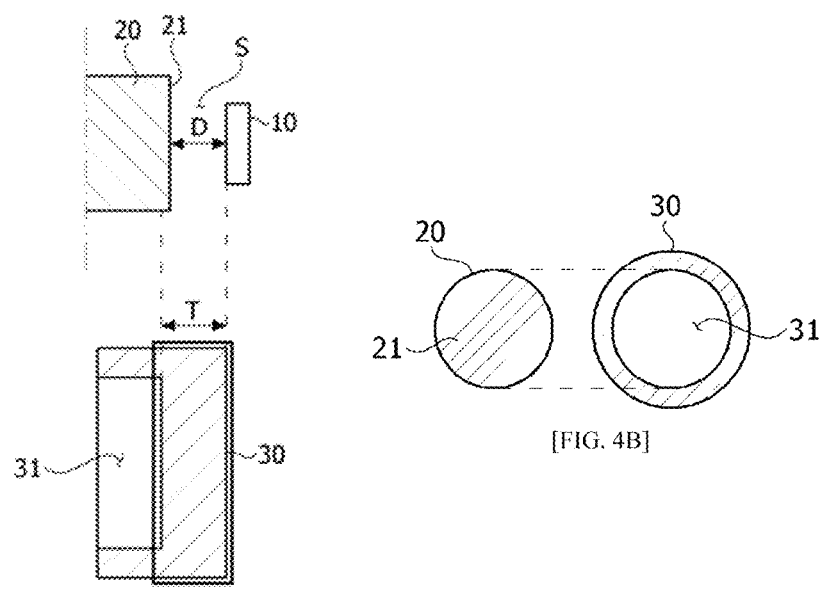
[FIG. 4B]

[FIG. 5]
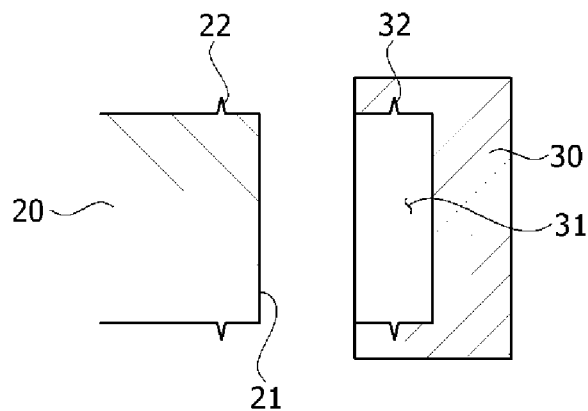
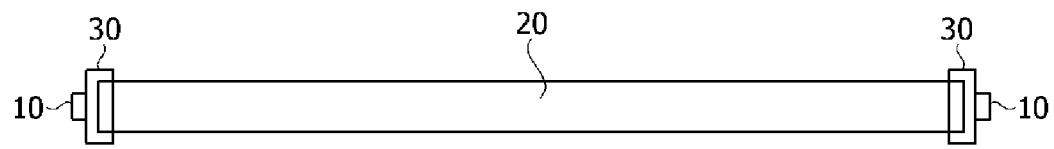
[FIG. 6A]
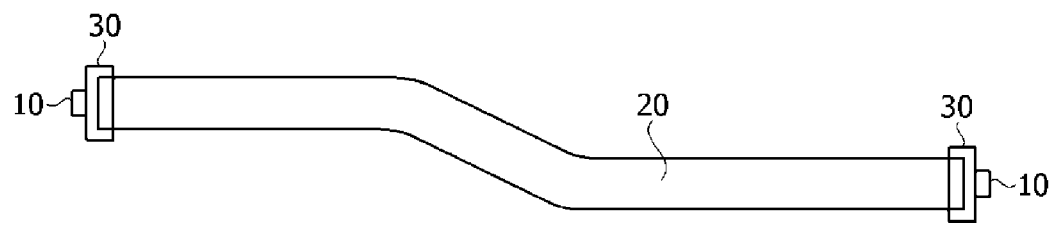
[FIG. 6B]

VEHICLE LIGHTING DEVICE

CROSS-REFERENCE TO RELATED APPLICATION

This application claims priority to and the benefit of Korean Patent Application No. 10-2023-0069152, filed on May 30, 2023, in the Korean Intellectual Property Office, the disclosure of which is incorporated herein by reference in its entirety for all purposes.

BACKGROUND

1. Field of the Invention

The present invention relates to a vehicle lighting device, and more specifically, to a vehicle lighting device which emits light along a light guide.

2. Discussion of Related Art

In general, various lighting devices are mounted in vehicles to provide the safety and driving convenience of the vehicles. These lighting devices include headlights, tail lights, turn signals, and the like.

Recently, in accordance with the trend of emphasizing a vehicle design, a lighting device in which a light guide is installed to emit light has been developed, wherein, while the light passes through the light guide, the light is totally or partially reflected in the light guide in order to achieve an indirect lighting effect without directly exposing a light source which generates the light.

However, since the light source and the light guide are disposed to be spaced apart from each other, an air layer exists between the light source and the light guide, the amount of light emitted from the light source is reduced while the light passes through the air layer, and thus there is a problem that a light efficiency is degraded.

SUMMARY OF THE INVENTION

The present invention is directed to providing a vehicle lighting device which prevents the degradation of light efficiency.

Objectives of the present invention are not limited to the above-described objectives, and other objectives which are not described above will be clearly understood to those skilled in the art from the following description.

According to an aspect of the present invention, there is a vehicle lighting device including a light source which generates light, a light guide which includes a light incident surface facing the light source and transmits light as the light enters the light guide through the light incident surface, and a cap member assembled to the light guide to cover the light incident surface, wherein the cap member is disposed with a structure in which one surface of the cap member is in contact with the light incident surface and the other surface thereof is in contact with the light source to fill a space between the light incident surface and the light source.

The light guide may include the light incident surface on one end portion or both end portions of the light guide in a longitudinal direction, and the cap member may be fixedly fitted onto and coupled to an end portion of the light guide.

The cap member may include a fitting groove into which the end portion is inserted and which is formed in the one surface of the cap member.

An area of the one surface of the cap member may be greater than an area of the light incident surface.

A thickness of the cap member in the fitting groove may be greater than or equal to a gap distance between the light incident surface and the light source.

The light guide may include a latching protrusion formed to protrude along a circumference of an outer circumferential surface of the end portion, and the cap member may include a catching groove formed to be recessed along an inner circumferential surface of the fitting groove to correspond to the latching protrusion.

Ultraviolet (UV) coating or phosphorus coating may be performed on the cap member.

A plasma process may be performed on the cap member.

The light guide may be formed of a transparent plastic material including polycarbonate (PC), polymethyl methacrylate (PMMA), or the like, and the cap member may be formed of a silicone material.

The cap member may be formed of a silicone material to which an ultraviolet (UV)-blocking material is added.

BRIEF DESCRIPTION OF THE DRAWINGS

FIG. 1 is a schematic view illustrating a vehicle lighting device according to an embodiment of the present invention;

FIG. 2 is a schematic view illustrating a light guide, a cap member, and a light source in the vehicle lighting device of FIG. 1;

FIG. 3 is a schematic view illustrating the light guide and the cap member in FIG. 2;

FIGS. 4A and 4B are views in which a thickness and an area of the cap member are compared;

FIG. 5 is a schematic view illustrating a latching protrusion of the light guide and a catching groove of the cap member; and FIGS. 6A and 6B are schematic views illustrating different shapes of the light guide.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments of the present invention will be described in detail with reference to the accompanying drawings, and components which are the same or correspond to each other will be denoted by the same or corresponding reference numerals in all drawings, and redundant descriptions will be omitted.

FIG. 1 is a schematic view illustrating a vehicle lighting device according to an embodiment of the present invention, and FIG. 2 is a schematic view illustrating a light guide, a cap member, and a light source in the vehicle lighting device of FIG. 1. FIG. 3 is a schematic view illustrating the light guide and the cap member in FIG. 2, and FIGS. 4A and 4B are views in which a thickness and an area of the cap member are compared. FIG. 5 is a schematic view illustrating a latching protrusion of the light guide and a catching groove of the cap member, and FIGS. 6A and 6B are schematic views illustrating different shapes of the light guide.

A lighting device 1 according to the embodiment of the present invention may be mounted in the front, rear, or inside of a vehicle and formed to implement lighting images having various shapes using an open lens L. As in the embodiment, the lighting device 1 may substantially implement a ring-shaped lighting image. The lighting image implemented by the lighting device 1 may be variously adjusted according to a shape of a light guide 20.

Referring to the drawings, the lighting device 1 for a vehicle according to the embodiment of the present invention may include a light source 10, the light guide 20, and a cap member 30.

The light source 10 may be formed to generate light. In the embodiment, the light source 10 may include a light emitting diode (LED) and may be fixedly mounted on a substrate 11. In addition, the substrate 11 may be mounted on a heatsink 12.

The heatsink 12 on which the light source 10 together with the substrate 11 is mounted may be assembled to a housing H of the lighting device 1.

The light guide 20 may include a light incident surface 21 facing the light source 10 and may be formed to transmit light as light of the light source 10 enters the light guide 20 through the light incident surface 21. The transmitted light may be emitted to the outside through the lens L.

The light guide 20 may have a long pipe or bar shape extending in a substantially longitudinal direction and may include the light incident surface 21 on both end portions or one end portion of the light guide 20 in the longitudinal direction. In the present embodiment, it is illustrated that the light incident surface 21 is provided on each of the both end portions.

The light guide 20 may have any of various shapes corresponding to lighting images implemented by the lighting device 1. In the embodiment, the light guide 20 may have a ring structure having a substantially circular shape. In addition, a pair of light incident surfaces 21 may be disposed adjacent to each other to face the same direction. In addition, a fixing part may be disposed between the both end portions on which the light incident surfaces 21 are provided to fixedly connect the both end portions. That is, the strip-shaped light guide 20 maintains the ring structure.

In the present embodiment, it is illustrated that the light guide 20 has the ring structure having the substantially circular shape, but the present invention is not limited thereto. For example, the light guide 20 may have a straight shape as illustrated in FIG. 6A, may have a bent shape as illustrated in FIG. 6B, and the shape may be changed to any of various shapes.

In addition, in the present embodiment, it is illustrated that a cross-sectional shape of the light guide 20 is a circular shape, but the present invention is not limited thereto, and the cross-sectional shape of the light guide 20 may be any of various shapes such as a polygonal shape and the like.

In the embodiment, the light guide 20 may be formed of a transparent plastic material including polycarbonate (PC), polymethyl methacrylate (PMMA), or the like. However, the material is not limited thereto.

The light guide 20 may be fixed on a back cover, which is not illustrated, and assembled to the housing H of the lighting device 1 with the light source 10. In this case, the light guide 20 may be disposed with a structure in which the light incident surface 21 is disposed to be spaced a predetermined distance from the light source 10. Accordingly, the light guide 20 can be prevented from yellowing due to ultraviolet (UV) light and heat generated by the light source 10.

However, due to a separation structure between the light guide 20 and the light source 10, a space S is present between the light incident surface 21 and the light source 10, and thus there is a problem that light generated by the light source 10 is not fully incident on the light incident surface 21 and is partially lost due to an air gap in the space S. That is, since the air gap is present between the light incident surface 21 and the light source 10, a propagation medium of the light increases, and thus a transmittance of light which enters the light guide 20 from the light source 10 is lowered to degrade light efficiency.

The cap member 30 is assembled to the light guide 20 to cover the light incident surface 21 and formed to fill the space S between the light incident surface 21 and the light source 10. Accordingly, there is no air gap between the light guide 20 and the light source 10.

In the embodiment, the cap member 30 may be formed of silicone.

The cap member 30 may be formed to be fixedly fitted onto and coupled to an end portion of the light guide 20 on which the light incident surface 21 is provided. In addition, in the space S between the light incident surface 21 and the light source 10, the cap member 30 may be disposed with a structure in which one surface of the cap member 30 is in contact with the light incident surface 21 and the other surface thereof is in contact with the light source 10. In this case, the one surface may be a surface facing the light guide 20, and the other surface may be a surface facing the light source 10.

The cap member 30 may have a structure in which an area of the one surface of the cap member 30 may be greater than an area of the light incident surface 21, and the other surface of the cap member 30 may include a fitting groove 31 into which the end portion of the light guide 20 is inserted. The fitting groove 31 may be formed to be recessed from the one surface in a shape corresponding to the cross-sectional shape of the light guide 20.

In addition, the cap member 30 may have a structure in which a thickness T of a portion (30-5) of the cap member 30 at the fitting groove 31 is greater than or equal to a gap distance D between the light incident surface 21 and the light source 10. Accordingly, even when a deviation occurs because the gap between the light guide 20 and the light source 10 assembled to the housing H is not uniform for each lighting device 1, the deviation can be compensated for to prevent generation of the air gap.

As described above, in the present embodiment, since the cap member 30 having the thickness corresponding to the gap between the light incident surface 21 of the light guide 20 and the light source 10 is fitted onto and coupled to the end portion of the light guide 20, the light guide 20 and the light source 10 are assembled to the housing H, and the cap member 30 fills the space S formed between the light guide 20 and the light source 10 so that light of the light source 10 may be totally reflected within the cap member 30 to fully enter the light guide 20. Accordingly, occurrence of light loss due to the air gap can be prevented to prevent the degradation of light efficiency.

In the embodiment, a plasma process may be performed on an inner circumferential surface of the fitting groove 31 of the cap member 30 to increase light efficiency.

In the embodiment, UV coating or phosphorus coating may be performed on the cap member 30 to prevent yellowing caused by UV light. UV coating or phosphorus coating may be performed on at least one of an outer circumferential surface of the cap member 30 and the inner circumferential surface of the fitting groove 31. In addition, the cap member 30 may be formed of a silicone material to which a UV-blocking material or phosphorus is added.

That is, UV coating or phosphorus coating may be performed on the cap member 30 which is in direct contact with the light source 10 instead of the light guide 20, or the UV-blocking material or phosphorus may be mixed with the material of the cap member 30 to prevent the light guide 20 from yellowing. In addition, a cost for UV-blocking material coating, phosphorus and UV coating, or phosphorus coating performed on the light guide 20, which is much larger than the cap member 30, can be reduced.

Meanwhile, as illustrated in FIG. 5, for smooth assembly of the light guide 20 and the cap member 30, the light guide 20 may include a latching protrusion 22 which protrudes from the end portion of the light guide 20 along an outer circumferential surface of the light guide 20. In addition, the cap member 30 may include a catching groove 32 formed to be recessed along a circumference of the inner circumferential surface of the fitting groove 31 to correspond to the latching protrusion 22.

The cap member 30 may be fitted onto and coupled to the light guide 20 with a structure in which the latching protrusion 22 and the catching groove 32 are engaged and can be prevented from being easily pulled out and separated due to an external impact.

In the present embodiment, it is illustrated that the latching protrusion 22 is formed to protrude from the light guide 20 and the catching groove 32 is formed to be recessed from the fitting groove 31 of the cap member 30, but the present invention is not limited thereto. Conversely, the catching groove 32 may be formed to be recessed in the light guide 20, and the latching protrusion 22 may be formed to protrude from the cap member 30.

In the embodiment, the latching protrusion 22 and the catching groove 32 may be provided with screw thread structures which are engaged with each other. That is, the cap member 30 may be assembled with the light guide 20 through a bolt-nut fastening method. In this case, the light guide 20 may correspond to a bolt, and the cap member 30 may correspond to a nut. Accordingly, assembly and disassembly between the cap member 30 and the light guide 20 may be easy, and a bonding surface between the latching protrusion 22 and the catching groove 32 may function as a total reflection surface to totally reflect light entering the cap member 30 so that the light fully enters the light guide 20 to increase light efficiency.

According to an embodiment of the present invention, a vehicle lighting device which can prevent the degradation of light efficiency because there is no air layer between a light source and a light guide.

Effects of the present invention are not limited to the above-described effects, and other effects which are not described will be clearly understood by those skilled in the art from the description of the claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions D of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle lighting device comprising:
a light source configured to generate light;
a light guide including a pair of light incident surfaces on two end portions in a longitudinal direction facing the light source configured to transmit light as the light enters the light guide through the light incident surface; and
a cap member assembled to the light guide to cover the light incident surface, the cap member fixedly fitted onto and coupled to the two end portions of the light guide on which the light incident surface is included,
wherein the cap member is configured to fill a space between the light incident surface and the light source, the cap member has a fitting groove structure into which at least one end portion of the light guide is inserted, the fitting groove structure has one portion that has an inner surface that is in contact with the light incident surface of the light guide that faces the light source and two portions of the cap member connected to the one portion are in contact with side surfaces of the at least one end portion of the light guide is inserted into the fitting groove structure, the light source is in contact with an outer surface of the one portion of the cap member, the one portion of the cap member has a thickness that is greater than a gap between the light incident surface and the light source,
wherein the pair of light incident surfaces are disposed adjacent to each other to face a same direction and the light guide is configured to have a ring shaped structure.

2. The vehicle lighting device of claim 1, wherein an area of the one surface of the cap member is greater than an area of the light incident surface.

3. The vehicle lighting device of claim 1, wherein:
the light guide includes a latching protrusion protruding along a circumference of an outer circumferential surface of the at least one end portion; and
the cap member includes a catching groove that is recessed along an inner circumferential surface of the fitting groove structure to correspond to the latching protrusion.

4. The vehicle lighting device of claim 1, wherein ultraviolet (UV) coating or phosphorus coating is performed on the cap member.

5. The vehicle lighting device of claim 1, wherein a plasma process is performed on the cap member.

6. The vehicle lighting device of claim 1, wherein:
the light guide comprises a transparent plastic material including polycarbonate (PC), polymethyl methacrylate (PMMA); and
the cap member comprises a silicone material.

7. The vehicle lighting device of claim 6, wherein the cap member comprises a silicone material to which an ultraviolet (UV)-blocking material is added.

8. The vehicle lighting device of claim 1, further comprising a fixing part disposed between the two end portions and fixedly connect the two end portions to make the light guide maintain the ring structure.

* * * * *